(12) United States Patent
Chae

(10) Patent No.: US 11,662,911 B2
(45) Date of Patent: May 30, 2023

(54) MEMORY SYSTEM AND OPERATING METHOD THEREOF

(71) Applicant: SK hynix Inc., Gyeonggi-do (KR)

(72) Inventor: Chol Su Chae, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 353 days.

(21) Appl. No.: 17/009,330

(22) Filed: Sep. 1, 2020

(65) Prior Publication Data
US 2021/0255781 A1    Aug. 19, 2021

(30) Foreign Application Priority Data
Feb. 18, 2020 (KR) ................. 10-2020-0019614

(51) Int. Cl.
G06F 3/06 (2006.01)

(52) U.S. Cl.
CPC .......... G06F 3/0613 (2013.01); G06F 3/0658 (2013.01); G06F 3/0659 (2013.01); G06F 3/0679 (2013.01)

(58) Field of Classification Search
CPC ............. G06F 12/0246; G06F 12/1009; G06F 12/0875; G06F 12/0292; G06F 3/064; G06F 3/0613; G06F 3/0679; G06F 3/0659; G06F 3/0658
See application file for complete search history.

(56) References Cited

U.S. PATENT DOCUMENTS

2020/0089617 A1* 3/2020 Onishi ................ G06F 12/0246

FOREIGN PATENT DOCUMENTS

| KR | 10-0674977 | 1/2007 |
| KR | 10-2015-0029404 | 3/2015 |

* cited by examiner

Primary Examiner — Ernest Unelus
(74) Attorney, Agent, or Firm — IP & T Group LLP

(57) ABSTRACT

A memory system includes a memory device including a plurality of memory blocks and a controller suitable for controlling the memory device to store a read retry table that includes a plurality of read bias sets respectively corresponding to a plurality of indexes; controlling the memory device to perform a read retry operation with the read bias sets according to an ascending order of the indexes; updating, when a read operation is successfully performed during the read retry operation, the read retry table by including the read levels of the successful read operation into a read bias set of a highest priority index within the read retry table; and controlling the memory device to perform a subsequent read retry operation based on the updated read retry table.

20 Claims, 15 Drawing Sheets

FIG. 6

|  | RB_MSB1 | RB_LSB | RB_MSB2 |
|---|---|---|---|
| INDEX 1 | RBS 1 | R11 | R21 | R31 |
| INDEX 2 | RBS 2 | R12 | R22 | R32 |
| INDEX 3 | RBS 3 | R13 | R23 | R33 |
| INDEX 4 | RBS 4 | R14 | R24 | R34 |
| INDEX 5 | RBS 5 | R15 | R25 | R35 |

|         |       | RB_MSB1 | RB_LSB | RB_MSB2 |
|---------|-------|---------|--------|---------|
| INDEX 1 | RBS 1 | R12     | R24    | R32     |
| INDEX 2 | RBS 2 | R11     | R21    | R31     |
| INDEX 3 | RBS 3 | R13     | R22    | R33     |
| INDEX 4 | RBS 4 | R14     | R23    | R34     |
| INDEX 5 | RBS 5 | R15     | R25    | R35     |

FIG. 10B

|       | RB_MSB1 | RB_CSB1 | RB_LSB1 | RB_CSB2 | RB_MSB2 | RB_CSB3 | RB_LSB2 |
|-------|---------|---------|---------|---------|---------|---------|---------|
| RBS 1 | R11     | (R21)   | R31     | (R41)   | R51     | (R61)   | R71     |
| RBS 2 | (R12)   | R22     | R32     | R42     | (R52)   | R62     | R72     |
| RBS 3 | R13     | R23     | R33     | R43     | R53     | R63     | R73     |
| RBS 4 | R14     | R24     | (R34)   | R44     | R54     | R64     | (R74)   |
| RBS 5 | R15     | R25     | R35     | R45     | R55     | R65     | R75     |

~1004

↓

|       | RB_MSB1 | RB_CSB1 | RB_LSB1 | RB_CSB2 | RB_MSB2 | RB_CSB3 | RB_LSB2 |
|-------|---------|---------|---------|---------|---------|---------|---------|
| RBS 1 | R12     | R21     | R34     | R41     | R52     | R61     | R74     |
| RBS 2 | R11     | R22     | R31     | R42     | R51     | R62     | R71     |
| RBS 3 | R13     | R23     | R32     | R43     | R53     | R63     | R72     |
| RBS 4 | R14     | R24     | R33     | R44     | R54     | R64     | R73     |
| RBS 5 | R15     | R25     | R35     | R45     | R55     | R65     | R75     |

|  |  | MSB1 | LSB | MSB2 |
|---|---|---|---|---|
| PAGE 1 | RBS 1 | E111 | E121 | E131 |
|  | RBS 2 | E112 | E122 | E132 |
|  | RBS 3 | E113 | E123 | E133 |
|  | RBS 4 | E114 | E124 | E134 |
|  | RBS 5 | E115 | E125 | E135 |
| ⋮ | ⋮ | ⋮ | ⋮ | ⋮ |
| PAGE m | RBS 1 | Em11 | Em21 | Em31 |
|  | RBS 2 | Em12 | Em22 | Em32 |
|  | RBS 3 | Em13 | Em23 | Em33 |
|  | RBS 4 | Em14 | Em24 | Em34 |
|  | RBS 5 | Em15 | (Em25) | Em35 |
| ⋮ | ⋮ | ⋮ | ⋮ | ⋮ |
| PAGE n | RBS 1 | En11 | En21 | En31 |
|  | RBS 2 | En12 | En22 | En32 |
|  | RBS 3 | (En13) | En23 | (En33) |
|  | RBS 4 | En14 | En24 | En34 |
|  | RBS 5 | En15 | En25 | En35 |
| MIN |  | En13 | Em25 | En33 |

(row for PAGE m — 1202)

FIG. 13

|  | RB_MSB1 | RB_LSB | RB_MSB2 | |
|---|---|---|---|---|
| INDEX 1 | RBS 1 | R_MIN1 | R_MIN2 | R_MIN3 | ~1302 RBS_SUB |
| INDEX 2 | RBS 2 | R12 | R24 | R32 |
| INDEX 3 | RBS 3 | R11 | R21 | R31 |
| INDEX 4 | RBS 4 | R13 | R22 | R33 |
| INDEX 5 | RBS 5 | R14 | R23 | R34 |
| INDEX 6 | RBS 6 | R15 | R25 | R35 |

MEMORY SYSTEM AND OPERATING METHOD THEREOF

CROSS-REFERENCE TO RELATED APPLICATION(S)

The present application claims priority under 35 U.S.C. § 119(a) to Korean Patent Application No. 10-2020-0019614, filed on Feb. 18, 2020, the disclosure of which is incorporated herein by reference in its entirety.

BACKGROUND

1. Field

Various embodiments of the present disclosure generally relate to a memory system, and more particularly, to a memory system for updating a read retry table, and an operating method of the memory system.

2. Description of the Related Art

The computer environment paradigm has been transitioning to ubiquitous computing, which enables computing systems to be used virtually anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since memory systems have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments of the present disclosure are directed to a memory system that may update a read retry table so that read levels used during a read operation can be preferentially used during a subsequent read retry operation so that the read operation is successfully performed during a read retry operation.

In accordance with an embodiment of the present disclosure, a memory system includes: a memory device including a plurality of memory blocks; and a controller suitable for controlling the memory device to store a read retry table that includes a plurality of read bias sets respectively corresponding to a plurality of indexes; controlling the memory device to perform a read retry operation with the read bias sets according to an ascending order of the indexes; updating, when a read operation is successfully performed during the read retry operation, the read retry table by including the read levels of the successful read operation into a read bias set of a highest priority index within the read retry table; and controlling the memory device to perform a subsequent read retry operation based on the updated read retry table.

In accordance with another embodiment of the present disclosure, an operating method of a memory system, comprising: loading a read retry table that includes a plurality of read bias sets respectively corresponding to a plurality of indexes; performing a read retry operation with the read bias sets according to an ascending order of the indexes; updating, when a read operation is successfully performed during the read retry operation, the read retry table by including the read levels of the successful read operation into a read bias set of a highest priority index within the read retry table; and performing a subsequent read retry operation based on the updated read retry table.

In accordance with still another embodiment of the present disclosure, an operating method of a controller, the operating method comprising: controlling a memory device to perform a read retry operation on a storage unit with a sequence of sets arranged according to a priority, each of the sets including one or more read biases; and re-arranging, when the read retry operation is a success with one set among the sets, the sets according to the order by assigning a highest priority to the set which was the success.

BRIEF DESCRIPTION OF THE DRAWINGS

FIG. 6 is a diagram illustrating a read retry table.

FIG. 10A is a diagram illustrating an updated read retry table.

FIG. 10B is a diagram illustrating an updated read retry table in a TLC memory device.

FIG. 12 is a diagram illustrating a method for detecting read levels having a minimum number of error bits.

FIG. 13 is a diagram illustrating a method for updating a read retry table to a read level corresponding to a minimum number of error bits.

DETAILED DESCRIPTION

Figure 1:
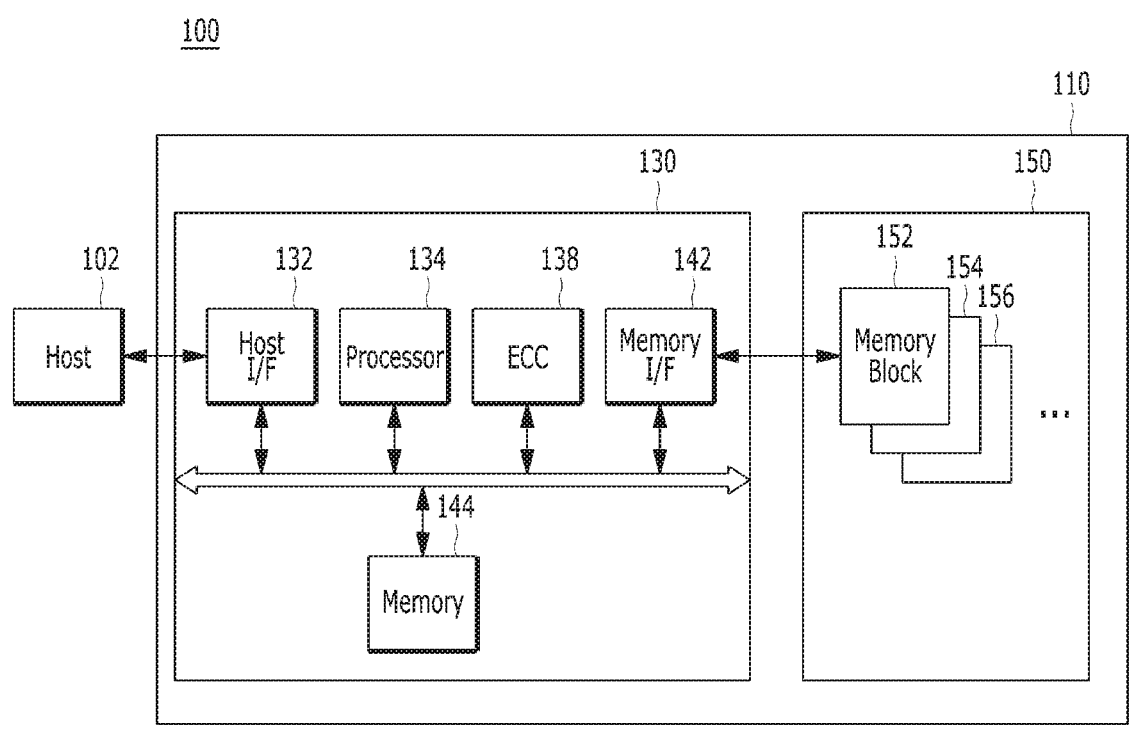
FIG. 1 is a diagram schematically illustrating an example of a data processing system including a memory system in accordance with an embodiment of the present disclosure.

Various embodiments of the present disclosure will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments.

FIG. 1 is a block diagram illustrating a data processing system 100 in accordance with an embodiment.

Referring to FIG. 1, the data processing system 100 may include a host 102 operatively coupled to a memory system 110.

The host 102 may include any of various portable electronic devices such as, but not limited to, a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support various functions and operations corresponding to the use, purpose, and usage of a user. For example, the OS may be divided into a general OS and a mobile OS, depending on the mobility of the host 102. The general OS may be divided into a personal OS and an enterprise OS, depending on the environment of a user.

The memory system 110 may operate in various ways, for example, to store data for the host 102 in response to a request of the host 102. Non-limiting examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the like. The SD card may include a mini-SD card and micro-SD card.

The memory system 110 may be embodied by various types of storage devices. Examples of such storage devices may include, but are not limited to, volatile memory devices such as a dynamic random access memory (DRAM) and a static RAM (SRAM), and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a memory device 150.

In an embodiment, the controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In an embodiment, the controller 130 and the memory device 150 may be integrated as one semiconductor device to constitute a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

The memory device 150 may be a nonvolatile memory device and may retain data stored therein even though power is not supplied. The memory device 150 may store data provided from the host 102 through a program operation, and provide data stored therein to the host 102 through a read operation. The memory device 150 may include a plurality of memory blocks 152, 154, 156 . . . each of which may include a plurality of pages, and each of the pages may include a plurality of memory cells coupled to a word line. In an embodiment, the memory device 150 may be a flash memory. The flash memory may have a 3-dimensional (3D) stack structure.

The structure of the memory device 150 will be described in more detail with reference to FIGS. 2 to 3.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, program, and erase operations of the memory device 150.

The controller 130 may include a host interface (IfF) 132, a processor 134, an error correction code (ECC) component 138, a Power Management Unit (PMU) 140, a memory I/F 142 such as a NAND flash controller (NFC), and a memory 144 all operatively coupled via an internal bus.

The host I/F 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE). The host I/F 132 may be driven through firmware referred to as a host interface layer (HIL) in order to exchange data with the host.

The ECC component 138 may detect and correct an error contained in the data read from the memory device 150. In other words, the ECC component 138 may perform an error correction decoding process to the data read from the memory device 150 through an ECC value used during an ECC encoding process. According to a result of the error correction decoding process, the ECC component 138 may output a signal, for example, an error correction success/fail signal. When the number of error bits is more than a threshold value of correctable error bits, the ECC component 138 may not correct the error bits, and may output an error correction fail signal. The ECC component 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC component 138 is not limited to any specific structure. The ECC component 138 may include all circuits, modules, systems or devices for error correction.

The memory I/F 142 may serve as a memory/storage interface for interfacing the controller 130 and the memory device 150 such that the controller 130 controls the memory device 150 in response to a request from the host 102.

The memory 144 may serve as a working memory of the memory system 110 and the controller 130, and store data for driving the memory system 110 and the controller 130. In an embodiment, the memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

As described above, the memory 144 may store various types of data, for example, data for performing a data write/read operation between the host and the memory device 150, and data when the data write/read operation is performed. In order to store such data, the memory 144 may include a program memory, data memory, write buffer/cache, read buffer/cache, data buffer/cache, map buffer/cache or the like.

The processor 134 may control the overall operations of the memory system 110. The processor 134 may drive firmware to control the overall operations of the memory system 110. The firmware may be referred to as flash translation layer (FTL). Also, the processor 134 may be realized as a microprocessor or a central processing unit (CPU).

For example, the controller 130 may perform an operation requested by the host 102 through the processor 134, which is realized as a microprocessor or a CPU. In other words, the controller 130 may perform a command operation corresponding to a command received from the host 102. The controller 130 may perform a foreground operation as the command operation corresponding to the command received from the host 102. Also, the controller 130 may perform a background operation onto the memory device 150 through the processor 134, which is realized as a microprocessor or a CPU. For example, the background operation performed onto the memory device 150 may include a garbage collection (GC) operation, a wear-leveling (WL) operation, a map flush operation, or a bad block management operation.

A memory device of the memory system in accordance with an embodiment of the present disclosure is described in detail with reference to FIGS. 2 to 3.

Figure 2:
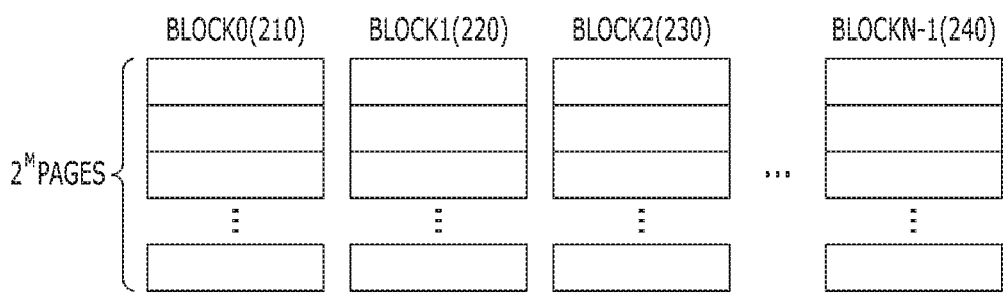
FIG. 2 is a diagram schematically illustrating an example of a memory device in a memory system in accordance with an embodiment of the present disclosure.
Figure 3:
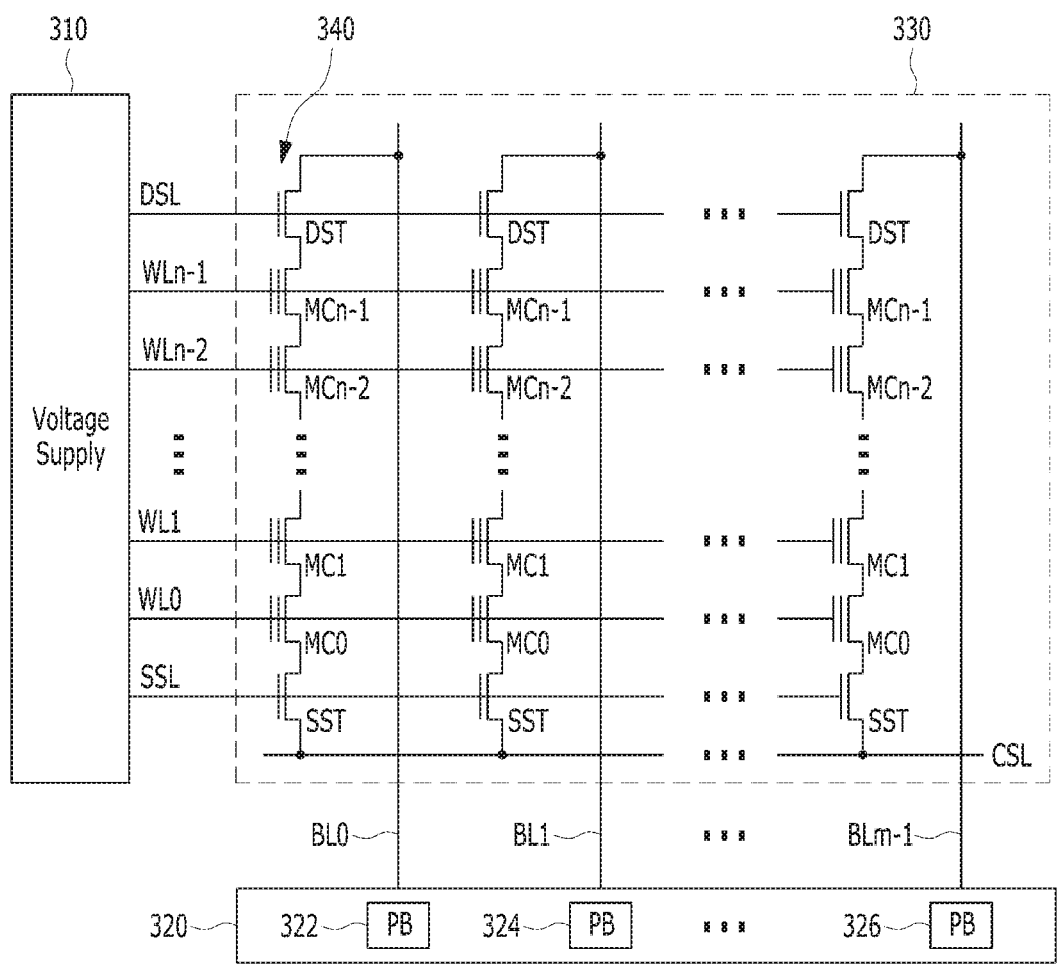
FIG. 3 is a diagram schematically illustrating a memory cell array circuit of memory blocks in a memory device in accordance with an embodiment of the present disclosure.

FIG. 2 is a schematic diagram illustrating the memory device 150, FIG. 3 is a circuit diagram illustrating a configuration of a memory cell array of a memory block in the memory device 150.

Referring to FIG. 2, the memory device 150 may include a plurality of memory blocks BLOCK0 to BLOCKN−1, e.g., BLOCK0 (210), BLOCK1 (220), BLOCK2 (230), and to BLOCKN−1 (240). Each of the memory blocks 210, 220, 230 and 240 may include a plurality of pages, for example 2M pages, the number of which may vary according to circuit design. For example, in some applications, each of the memory blocks may include M pages. Each of the pages may include a plurality of memory cells that are coupled to a word line WL.

Each of the memory blocks in the memory device 150 may include a single level cell (SLC) memory block capable of storing 1 bit in one memory cell, a multi-level cell (MLC) memory block capable of storing two bits in one memory cell, a triple level cell (TLC) memory block capable of storing three bits in one memory cell, a quadruple level cell (QLC) memory block capable of storing four bits in one memory cell, and a multiple level cell memory block capable of storing five or more bits in one memory cell, depending on the number of bits which can be stored in one memory cell.

In accordance with an embodiment of the present disclosure, the memory device 150 is described as a non-volatile memory, such as a flash memory, e.g., a NAND flash memory. However, the memory device 150 may also be, but not limited to, a Phase Change Random Access Memory (PCRAM), a Resistive Random Access Memory (RRAM or ReRAM), a Ferroelectric Random Access Memory (FRAM), a Spin Transfer Torque Magnetic Random Access Memory (STT-RAM or STT-MRAM).

The memory blocks 210, 220, 230, . . . , 240 may store the data transferred from the host 102 through a program operation, and transfer data stored therein to the host 102 through a read operation.

Referring to FIG. 3, a memory block 330, which may correspond to any of the plurality of memory blocks 152 to 156 included in the memory device 150 of the memory system 110, may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells or memory cell transistors MC0 to MCn−1 may be coupled in series. In an embodiment, each of the memory cells MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1. For reference, in FIG. 3, 'DSL' denotes a drain select line, 'SSL' denotes a source select line, and 'CSL' denotes a common source line.

Although FIG. 3 illustrates NAND flash memory cells, the invention is not limited in this way. For example, the memory cells may be NOR flash memory cells, or hybrid flash memory cells including two or more types of memory cells combined therein. Also, in an embodiment, the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage, and a pass voltage to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read and write (read/write) circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4A:
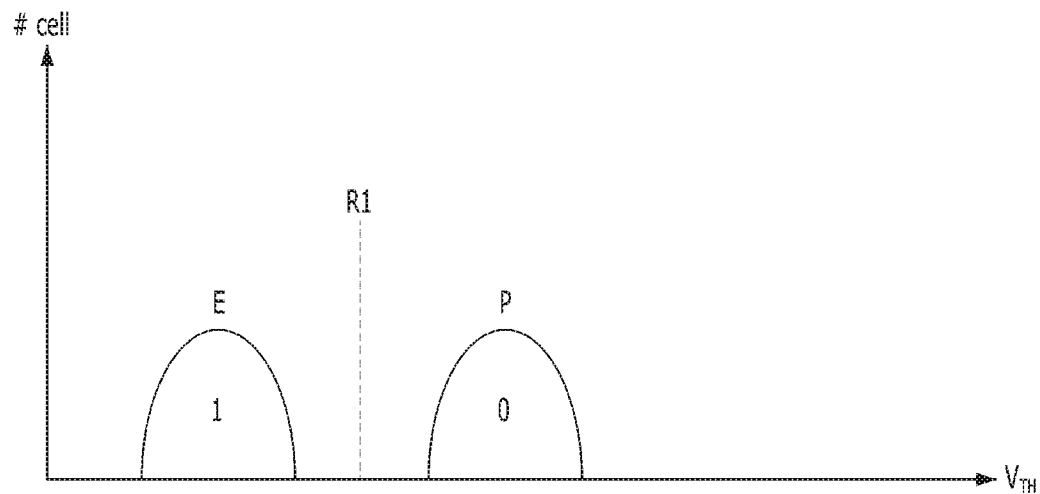
FIGS. 4A to 4C are threshold voltage distribution graphs illustrating program and erase states of SLC, MLC and TLC memory devices, respectively.
Figure 4B:
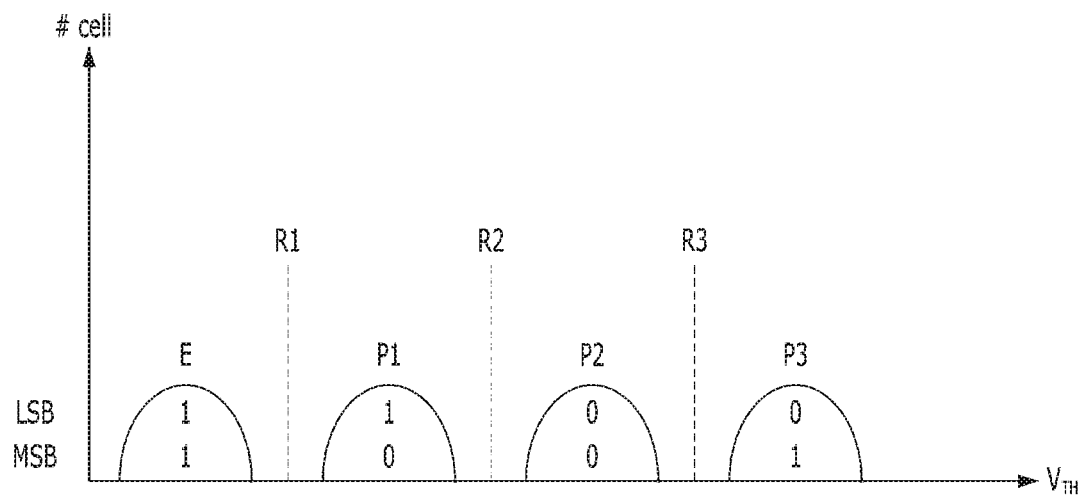
Figure 4C:
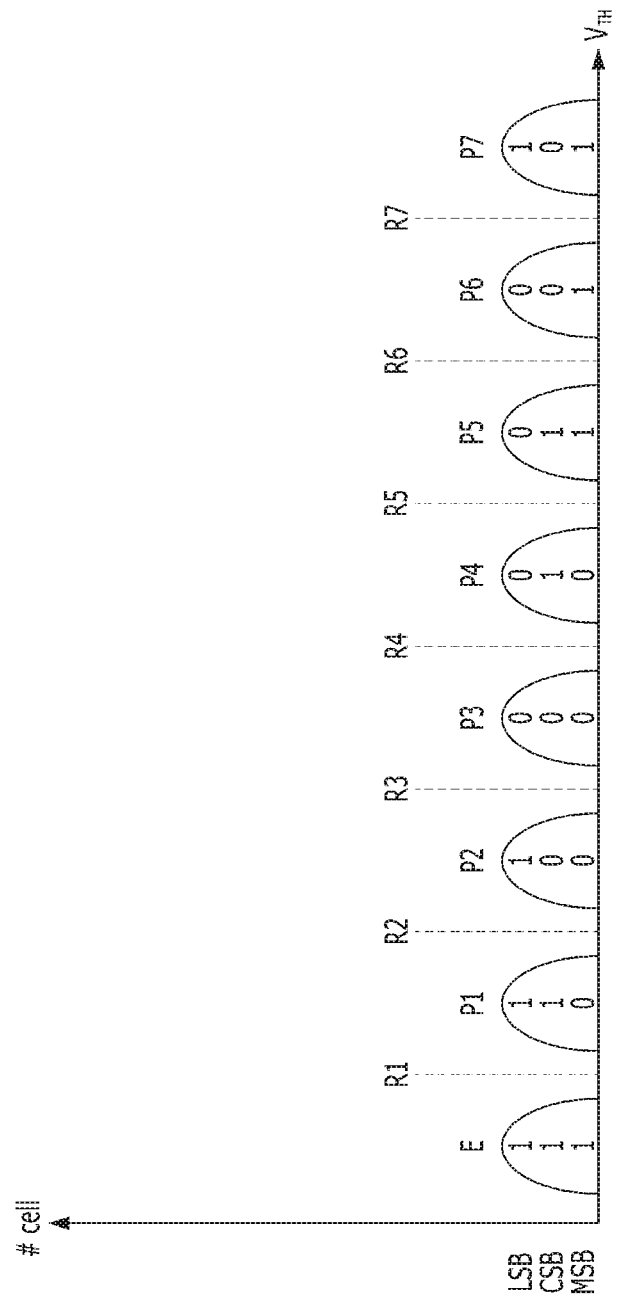

FIGS. 4A to 4C are threshold voltage distribution graphs illustrating program and erase states of SLC, MLC and TLC memory devices, respectively.

As described above with reference to FIG. 2, FIG. 4A illustrates a threshold voltage distribution in an SLC memory device in which each of memory cells is programmed with one bit, and FIG. 4B illustrates a threshold voltage distribution in an MLC memory device in which each of the memory cells is programmed with two bits. FIG. 4C illustrates a threshold voltage distribution in a TLC memory device in which each of the memory cells is programmed with three bits.

In a case of the SLC memory device, each of the memory cells has a threshold voltage included in one of an erase state E and a program state P, as illustrated in FIG. 4A, according to a value of programmed data. For example, memory cells where data having a value of "1" is programmed to have a threshold voltage distribution indicating the erase state E, and memory cells where data having a value of "0" is programmed to have a threshold voltage distribution indicating the program state P. The two cell distributions E and P may be identified by a first read voltage R1 which is set to a voltage level between the two cell distributions E and P. For example, after the first read voltage R1 is applied to the memory cells, the controller 130 may identify turned-on memory cells as the erase state E and turned-off memory cells as the program state P.

In a case of the MLC memory device, each of the memory cells has a threshold voltage included in one of the erase state E and first to third program states P1 to P3, as illustrated in FIG. 4B, according to a value of programmed data. For example, memory cells where 2-bit data whose most significant bit (MSB) has a value of "1" and least significant bit (LSB) also has a value of "1", that is, data having a value of "11", is programmed to have a threshold voltage distribution indicating the erase state E. In a similar manner, memory cells where data having values of "01", "00" and "10" are programmed to have the first to third program states P1 to P3, respectively.

The cell distributions E and P1 where the LSB has a value of "1" and the cell distributions P2 and P3 where the LSB has a value of "0" may be identified by a second read voltage R2 which is set to a voltage level between the cell distributions P1 and P2 indicating the first and second program states, respectively. For example, after the second read voltage R2 is applied to the memory cells, the controller 130 may identify turned-on memory cells as one of the erase state E and the first program state P1 and turned-off memory cells as one of the second and third program states P2 and P3.

The cell distributions E and P3 where the MSB has a value of "1" and the cell distributions P1 and P2 where the MSB has a value of "0" may be identified by the first read voltage R1 and a third read voltage R3. For example, memory cells, which are identified as one of the erase state E and the first program state P1 by the second read voltage R2, may be identified by the first read voltage R1 set to a voltage level between the two cell distributions E and P1. After the first read voltage R1 is applied to the memory cells identified as one of the erase state E and the first program state P1, the controller 130 may identify turned-on memory cells as the erase state E and turned-off memory cells as the first program state P1, In a similar manner, the controller 130 may apply the third read voltage R3 to the memory cells identified as one of the second and third program states P2 and P3 by the second read voltage R2, and identify the two cell distributions P2 and P3.

In a case of the TLC memory device, each of the memory cells has a threshold voltage included in one of the erase state E and first to seventh program states P1 to P7, as illustrated in FIG. 4C, according to a value of programmed data. For example, memory cells where 3-bit data whose MSB, central significant bit (CSB) and LSB have a value of "1", that is, data having a value of "111", is programmed to have a threshold voltage distribution indicating the erase state E. In a similar manner, memory cells where data having values of "011", "001", "000", "010", "110", "100" and "101" are programmed to have the first to seventh program states P1 to P7, respectively.

The cell distributions E, P1, P2 and P7 where the LSB has a value of "1" and the cell distributions P3 to P6 where the LSB has a value of "0" may be identified by the third read voltage R3 which is set to a voltage level between the cell distributions P2 and P3 indicating the second and third program states, respectively, and by a seventh read voltage R7 which is set to a voltage level between the cell distributions P6 and P7 indicating the sixth and seventh program states, respectively.

The cell distributions E, P1, P4 and P5 where the CSB has a value of "1" and the cell distributions P2, P3, P6 and P7 where the CSB has a value of "0" may be identified by the second, fourth and sixth read voltages R2, R4 and R6.

The cell distributions E and P5 to P7 where the MSB has a value of "1" and the cell distributions P1 to P4 where the MSB has a value of "0" may be identified by the first and a fifth read voltages R1 and R5.

A read environment of a flash memory may vary due to read disturbance or retention characteristics of the flash memory, and the cell distribution may move as the read environment varies. When the read voltages described with reference to FIGS. 4A to 4C are applied to read the data stored in the memory cells while the voltage levels of the read voltages are kept the same, read errors in which data different from the programmed data may occur. The ECC component 138 described above with reference to FIG. 1 may detect and correct the read errors. When the read errors are not corrected even through an error correction operation performed by the ECC component 138, the controller 130 may control the memory device 150 to perform a read retry operation.

Figure 5:
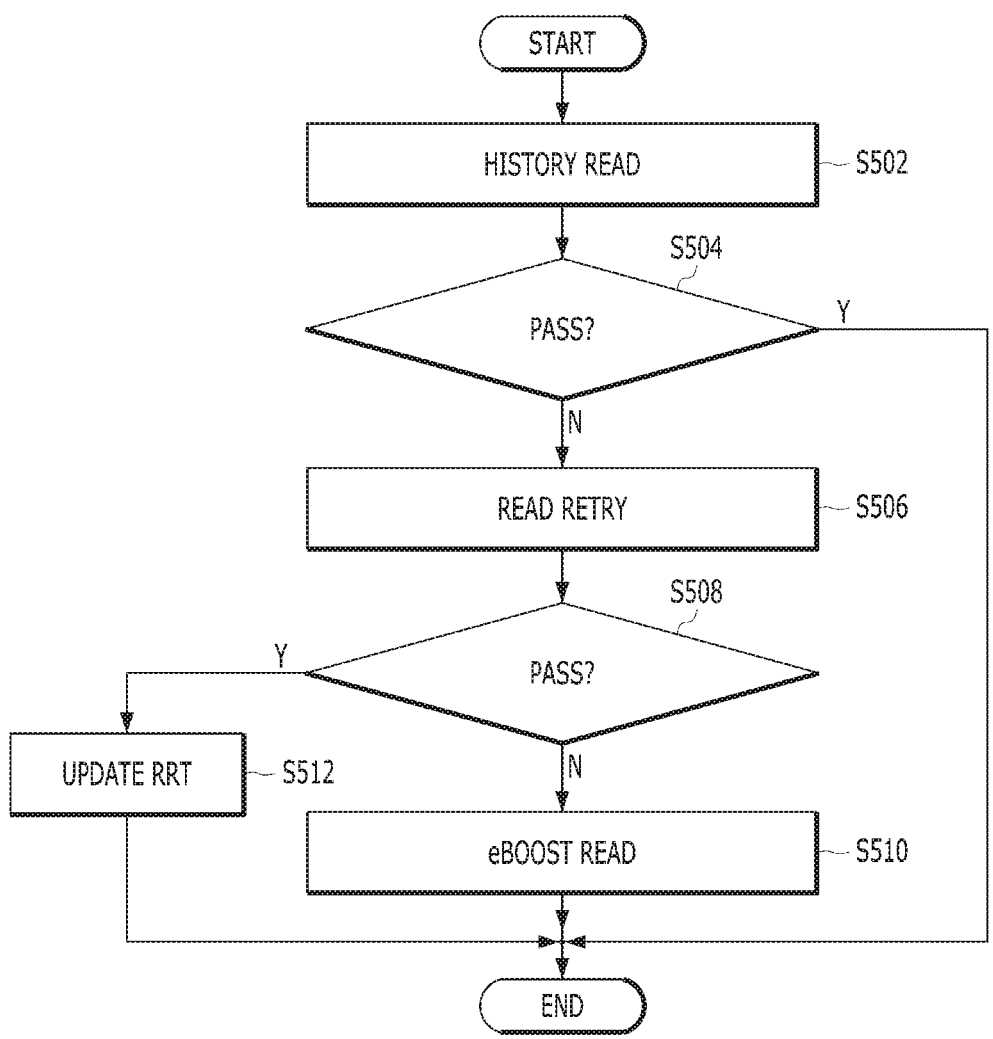
FIG. 5 is a flowchart illustrating read operations that are generally performed when read errors occur.

FIG. 5 is a flowchart illustrating an operating method of the memory system 110 in accordance with an embodiment of the present disclosure.

In operation S502, the controller 130 may perform a history read operation in response to a read command inputted from the host 102. The history read operation refers to a read operation performed with read levels (hereinafter referred to as "history read levels") used during a read operation that is most recently successful among previous read operations for memory blocks corresponding to the read command. The memory blocks may have different history read levels, and the controller 130 may store the history read levels corresponding to the memory blocks in a memory or memory blocks included in the controller.

In operation S504, the controller 130 may determine whether the history read operation performed in operation S502 has succeeded (i.e., is a "PASS"). Specifically, the controller 130 may determine that the history read operation has succeeded when errors are correctable through an ECC decoding operation for read data, and determine that the history read operation has failed when errors are not correctable through an ECC decoding operation for read data.

In a case of a sequential read operation, since the read operations are sequentially performed on a plurality of pages of the same memory block, there may be many cases in which history levels for a current read operation are recently updated. For example, when a host workload is sequential, the controller 130 may control the memory device 150 to sequentially perform the read operations on pages included in one memory block in response to a read command. When the read operation is successfully performed on a first page of a first memory block, the controller 130 may record read levels used during the successful read operation as history read levels, and use the recorded history read levels for a subsequent read operation on a second page of the first memory block. Therefore, in the case of the sequential read operation, the probability of errors occurring during the read operation using the history read levels may be low.

In a case of a random read operation, since data are read from random memory blocks, a read request for the memory block may be received a long time after a history read level for a memory block is updated. The read environment of the flash memory may vary between when the history read level for the memory block is updated and when the read request for the memory block is received. When the cell distribution moves according to the variation in a read environment, the read operation using the history read level may involve read errors.

In operation S506, the controller 130 may control the memory device to perform a read retry operation when the history read operation has failed (that is, "N" in operation S504). The controller 130 may control the memory device 150 to perform the read operation again on data programmed into a physical address, corresponding to the read command, at a read level different from the history read level from a read retry table. The read retry operation will be described in more detail with reference to FIG. 6.

In operation S508, the controller 130 may determine whether the read retry operation performed in operation S506 has succeeded (i.e., is a "PASS"). In a similar manner to operation S504, the controller 130 may determine that the read retry operation has succeeded when errors are correctable through an ECC decoding operation for read data, and determine that the read retry operation has failed when errors are not correctable through an ECC decoding operation for read data. A detailed method for performing the first read retry operation and a detailed method for determining whether the first read retry operation has succeeded will be described below with reference to FIG. 9A.

In operation S510, the controller 130 may perform an e-boost operation of searching for an optimal read voltage based on various algorithms, when the read retry operation has failed (that is, "N" in operation S508). For example, the controller 130 may perform the e-boost operation of searching for the optimal read voltage by causing the read voltage to have an intermediate value of peak values of adjacent threshold voltage distributions according to a Gaussian modeling algorithm. In addition, the controller 130 may perform the e-boost operation of reading specific data at least twice and searching for the optimal read voltage based on the read result. The controller 130 may control the memory device 150 to read the request data again by applying the optimum read voltage detected through the e-boost operation.

FIG. 6 is a diagram illustrating a read retry table 602.

Referring to FIG. 6, the read retry table 602 includes read levels for each read bias set. Each of the read bias sets may include a plurality of read levels, and FIG. 6 illustrates a case where each of the read bias sets includes three read levels RB_MSB1, RB_LSB and RB_MSB2, as an example. As described earlier with reference to FIG. 46, in the case of the MLC memory device, each of the read bias sets may include three read levels because three read levels are required to identify the states of the memory cells.

In the case of the MLC memory device, each of the memory cells may store data having two bits, and the bits may include an LSB and an MSB. A physical page including a plurality of memory cells may conceptually include first and second logical pages, and each of the first and second logical pages may store data corresponding to the LSB and MSB, respectively. The controller 130 may identify a value of the data stored in each of the memory cells included in the first logical page, based on the second read level RB_LSB, and identify a value of the data stored in each of the memory cells included in the second logical page, based on the first and third read levels RB_MSB1 and RB_MSB2.

For example, the controller 130 may determine that LSB data of the memory cells, which are turned on when a second read voltage having the second read level RB_LSB is applied to the first logical page, has a value of "1". The controller 130 may determine that MSB data of the memory cells, which are turned off when a first read voltage having the first read level RB_MSB1 is applied to the second logical page and are turned on when a third read voltage having the third read level RB_MSB2 is applied to the second logical page, has a value of "0".

In an embodiment, the controller 130 may repeatedly perform the read operation by changing the read level according to an ascending order of an index until the read retry operation is successfully performed on a single logical page, and then perform the read retry operations on the other logical pages. For example, the controller 130 may perform the read retry operation on the first logical page, based on a second read level R21 included in a first read bias set RBS1. When the read retry operation is failed, the controller 130 may perform the read retry operation on the first logical page, based on a second read level R22 included in a second read bias set RBS2. When the read retry operation is successfully performed, the controller 130 may perform the read retry operation on the second logical page, based on first and third read levels R11 and R31 included in the first read bias set RBS1.

In an embodiment, the controller 130 may sequentially change the read level from a read level of a single read bias set to a read level of a next index, and control the memory device to perform the read retry operation until read errors are corrected. For example, the read retry table 602 may include first to fifth read bias sets RBS1 to RBS5 corresponding to first to fifth indexes, respectively, and the controller 130 may perform the read retry operation based on the read levels R11, R21 and R31 included in the first read bias set RBS1. When the read retry operation is failed, the controller 130 may perform the read retry operation again based on read levels R12, R22 and R32 included in the second read bias set RBS2. The controller 130 may use the read retry table 602 when performing the read retry operations on all of the memory blocks included in the memory device.

As described above, the controller 130 may control the memory device 150 to perform the read retry operation of repeatedly performing the read operation with the read levels of the read bias sets according to an ascending order of the indexes. If the read bias sets corresponding to the indexes included in the read retry table have fixed values regardless of the threshold voltage distribution of memory cells, it is highly likely that the read operation with the read bias sets may failed. For example, the read levels R11, R21 and R31 included in the first read bias set RBS1 having the highest priority in the read retry table 602 may preferentially be used at all times whenever the read retry operation is performed. Since the read retry operation may include a plurality of read operations which are repeatedly performed until read errors are corrected, the number of read bias sets, which are used until the read retry operation is successfully performed, may be directly related to performance and speed of the read operations.

According to the present embodiment, when the read retry operation is successfully performed, the controller 130 may preferentially use the read levels, with which the successful read operation is performed, in a subsequent read retry operation, thereby reducing the time required to perform the read retry operation.

In addition, according to the present embodiment, the controller 130 may calculate the number of error bits occurring during the read operations for each of the pages included in the memory block, add the read bias set including the read levels corresponding to the minimum number of error bits and add the read bias set to the read retry table 602. The controller 130 may perform the read operation more quickly and accurately by preferentially using the read levels, which are more likely to succeed the read operation and cause fewer error bits, during the read retry operation.

Referring back to FIG. 5, in operation S512, the controller may update read retry table (which may be abbreviated as 'RRT') when the read retry operation has succeeded (that is, "Y" in operation S508).

Figure 7:
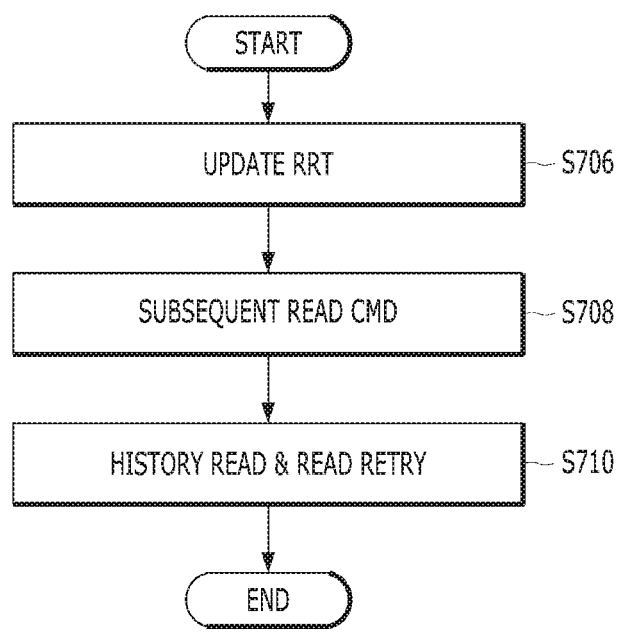
FIG. 7 is a flowchart illustrating an operating method of a memory system in accordance with an embodiment of the present disclosure.

FIG. 7 is a flowchart illustrating an operating method of the memory system 110 in accordance with an embodiment of the present disclosure.

In operation S706, the controller 130 may update the read retry table when the first read retry operation has succeeded. The operation S706 may corresponds to the operation S512 described in FIG. 5. According to the present embodiment, when the first read retry operation has succeeded, the controller 130 may update the read retry table so that the read levels used during the first read retry operation can be preferentially used during a subsequent read retry operation. For example, when the first read retry operation has succeeded with the read levels included in the third read bias set, the controller 130 may include the read levels of the third read bias set into the first read bias set, thereby controlling the memory device 150 to perform the read operation by preferentially using the read levels during the subsequent read retry operation. A detailed method for updating the read retry table will be described below with reference to FIG. 9B.

In operation S708, the controller 130 may receive a subsequent read command CMD from the host 102. A physical address corresponding to the read command CMD may indicate a memory block, which is the same as or different from a memory block on which the first read retry operation has been performed.

In operation S710, the controller 130 may perform a history read operation in response to the subsequent read command CMD, and when the history read operation has failed, the controller 130 may control the memory device 150 to perform a subsequent read retry operation based on the read retry table updated in operation S706. When the degrees of wear between the memory blocks included in the memory device 150 are similar to one another according to a wear-leveling operation or when the degrees of retention between the memory blocks are similar to one another, the success probability of a subsequent read retry operation may be increased with the read levels, with which a previous read retry operation has succeeded.

In accordance with the present embodiment, whenever the read retry operation is successfully performed, the controller 130 may update the read retry table so that the read levels of the successful read retry operation is preferentially used in a subsequent read retry operation. The controller 130 may use the updated read retry table when performing the read retry operation for the subsequent read command, thereby improving the speed and accuracy of the read operation.

Figure 8:
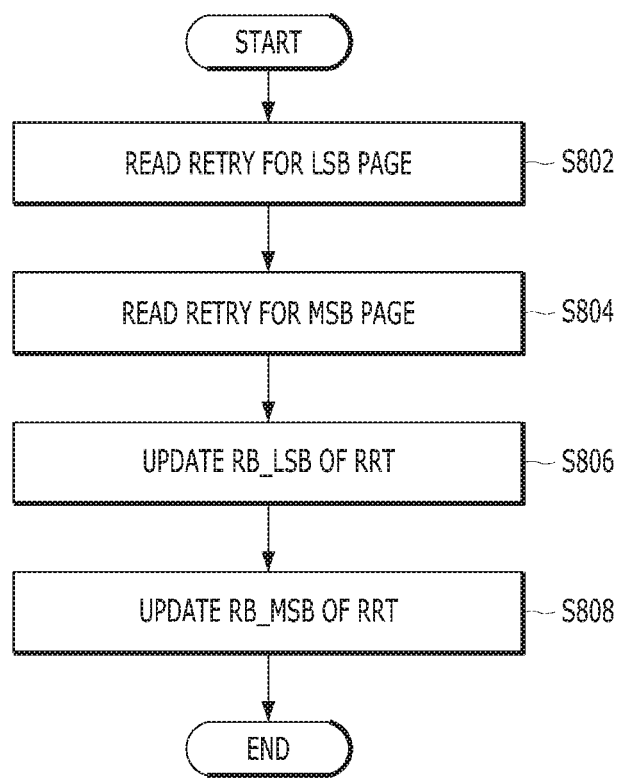
FIG. 8 is a flowchart illustrating a read retry operation and a method for updating a read retry table.

FIG. 8 is a flowchart illustrating the read retry operation and a method for updating the read retry table 602.

FIG. 8 illustrates that each of the read bias sets included in the read retry table 602 includes three read levels RB_MSB1, RB_LSB and RB_MSB2, as described above with reference to FIG. 6.

In operation S802, the controller 130 may control the memory device 150 to perform the read retry operation on a first logical page LSB PAGE. As described above, the first logical page LSB PAGE may be defined as a set of memory cells that store data corresponding to the LSB in the MSB memory device. The controller 130 may control the memory device 150 to perform the read retry operation by sequentially using the second read level RB_LSB according to an ascending order of the indexes in the read retry table 602 described above with reference to FIG. 6.

The controller 130 may determine whether the read retry operation has succeeded by performing an ECC decoding operation on data read whenever data are read. When the read retry operation is successfully performed, the controller 130 may separately store information on the read levels of the successful read retry operation, for a read retry table update operation to be performed in operation S806. For example, when the read retry operation using a second read level R24 included in the fourth read bias set RBS4 is successfully performed, the controller 130 may store information on the second read level R24 in the memory 144 or a memory block.

In operation S804, when the read retry operation is successfully performed on the first logical page, the controller 130 may control the memory device 150 to perform the read retry operation on a second logical page MSB PAGE. As described above, the second logical page MSB PAGE may be defined as a set of memory cells that store data corresponding to the MSB in the MLC memory device. The controller 130 may control the memory device 150 to perform the read retry operation by sequentially using the first and third read levels RB_MSB1 and RB_MSB2 according to an ascending order of the indexes in the read retry table 602 described above with reference to FIG. 6.

The controller 130 may determine whether the read retry operation has succeeded by performing the ECC decoding operation on data read whenever data are read. When the read retry operation is successfully performed, the controller 130 may separately store information on the read levels of the successful read retry operation, for a read retry table update operation to be performed in operation S808. For example, when the read retry operation using first and third read levels R12 and R32 included in the second read bias set RBS2 is successfully performed, the controller 130 may store information on the first and third read levels R12 and R32 in the memory 144 or a memory block.

In operation S806, when the read retry operation is successfully performed on the second logical page, the controller 130 may update the second read level RB_LSB of the read retry table 602. Specifically, the controller 130 may update the read retry table 602 so that the first read bias set RBS1 included in the read retry table 602 includes the second read level R24, based on the information on the second read level R24 stored in the memory 144 or the memory block in operation S802.

In operation S808, the controller 130 may update the first and third read levels RB_MSB1 and RB_MSB2 of the read retry table 602. Specifically, the controller 130 may update the read retry table 602 so that the first read bias set RBS1 included in the read retry table 602 includes the first and third read levels R12 and R32, based on the information on the first and third read levels R12 and R32 stored in the memory 144 or the memory block in operation S804.

Figure 9A:
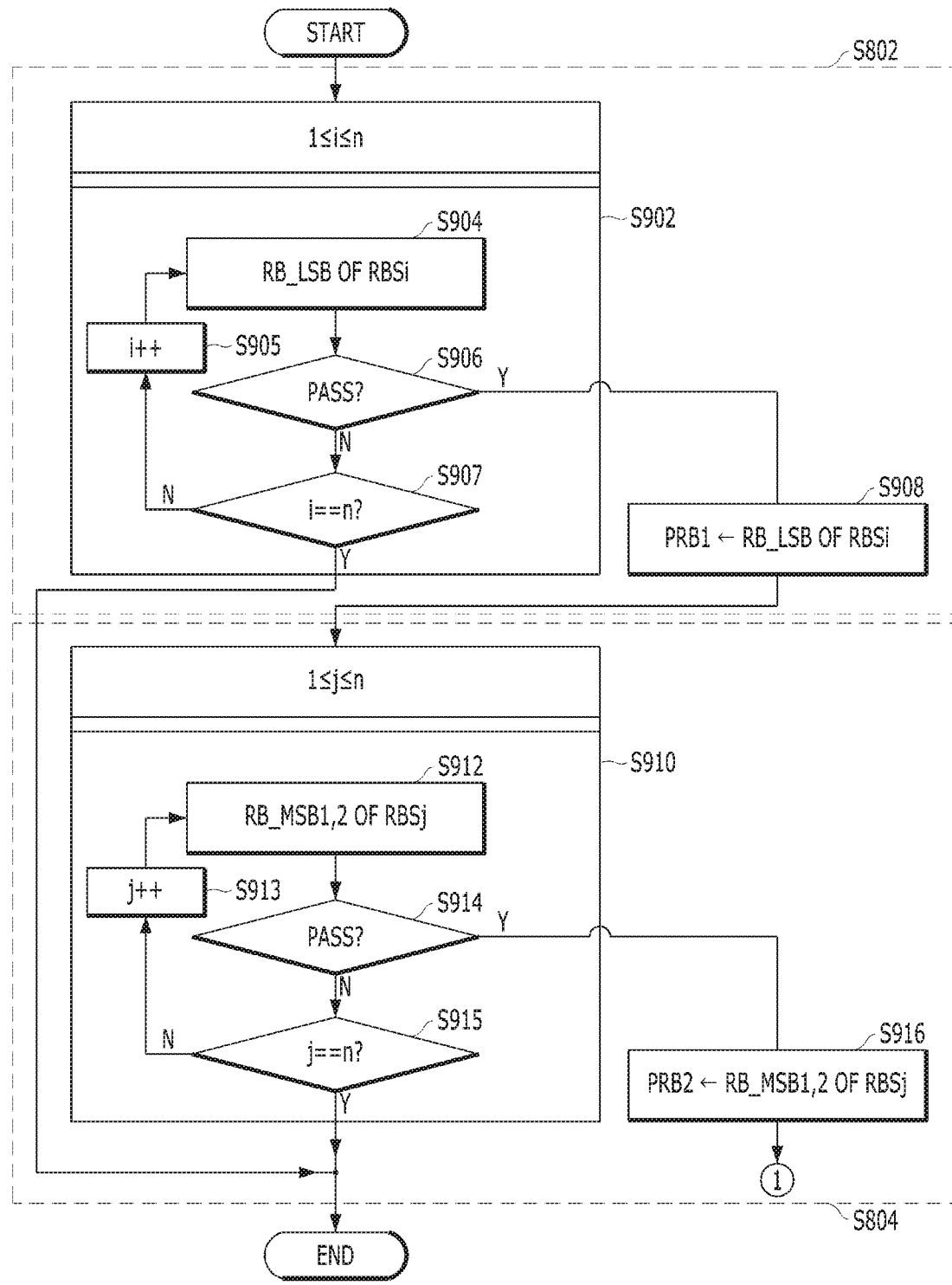
FIGS. 9A and 9B are detailed flowcharts illustrating a read retry operation and a method for updating a read retry table.
Figure 9B:
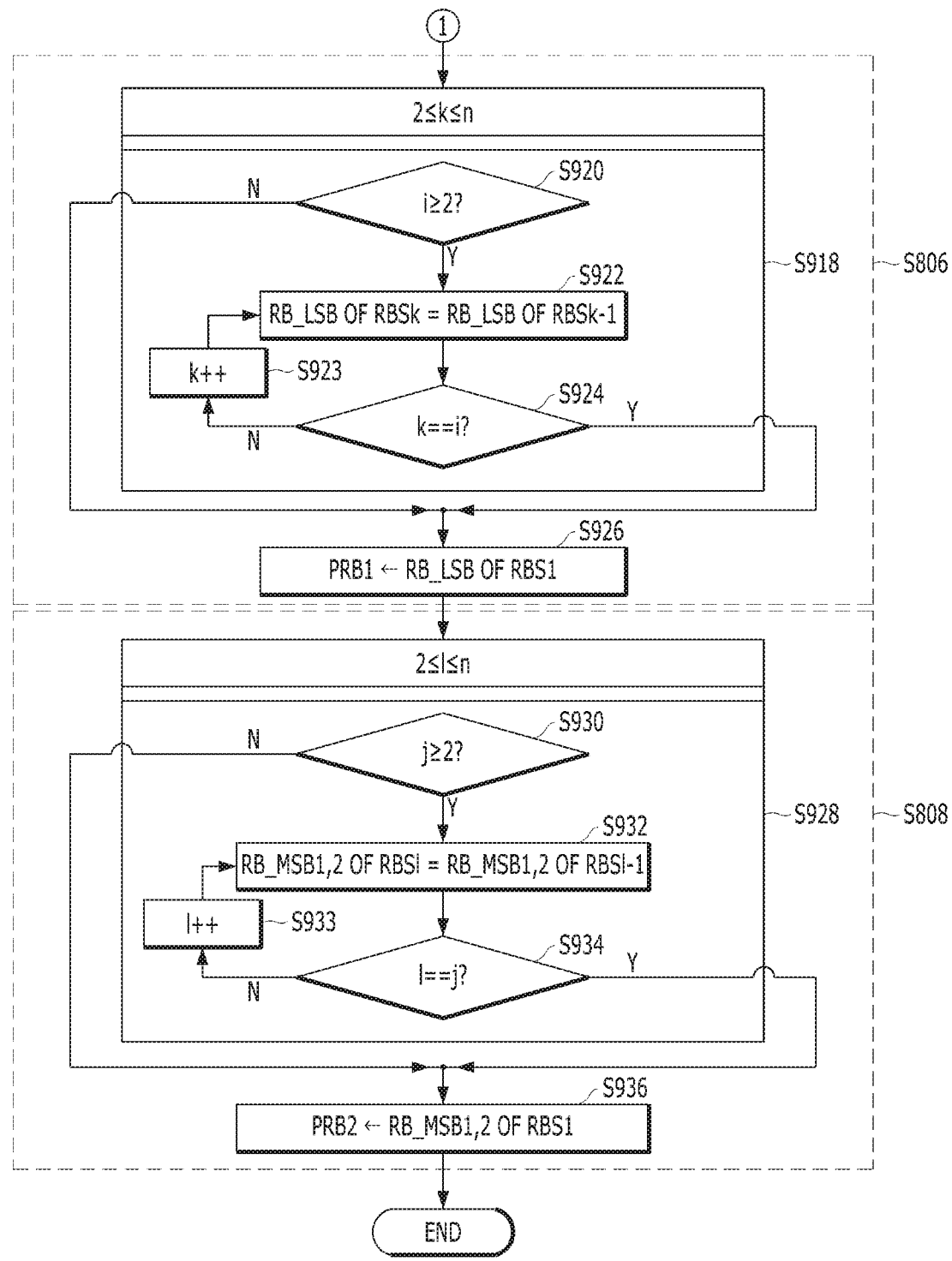

FIGS. 9A and 9B are detailed flowcharts illustrating the read retry operation and the method for updating the read retry table.

Referring to FIG. 9A, the operation S802 described with reference to FIG. 8 may include operations S902, S904, S905, S906, S907 and S908, and the operation S804 may include operations S910, S912, S913, S914, S915 and S916.

In operation S902, the controller 130 may control the memory device 150 to perform the read retry operation on the first logical page by sequentially using the read levels, included in each of the read bias sets, based on the read retry table. FIG. 9A illustrates a case where a total of "n" read bias sets are included in the read retry table. In the case of the read retry table 602 described above with reference to FIG. 6, "n" may have a value of "5". The controller 130 may increase "i" by a value of "1", using a second read voltage RB_LSB of an $i^{th}$ read bias set RBSi whenever the read operation fails. The controller 130 may control the memory device 150 to repeatedly perform the read operation by applying a different read bias set until the read retry operation is successfully performed on the first logical page.

In operation S904, the controller 130 may control the memory device 150 to perform the read operation on the first logical page, using the second read level RB_LSB of the $i^{th}$ read bias set RBSi. In an initial stage, the controller 130 may control the memory device 150 to perform the read operation on the first logical page, using the second read level R21 of the first read bias set RBS1.

In operation S906, the controller 130 may perform the ECC decoding operation on LSB data read in operation S904. The controller 130 may determine that the read operation has succeeded when errors are correctable, and determine that the read operation has failed when errors are not correctable. When the read operation has failed (that is, "N" in operation S906), the controller 130 may determine whether values of "i" and "n" are equal in operation S907.

When the value of "i" is smaller than the value of "n" (that is, "N" in operation S907), the controller 130 may increase index "i" by a value of "1" in operation S905, and the controller 130 may return back to the operation S904 and control the memory device 150 to perform the read operation on the first logical page, using the second read level R22 of the second read bias set RBS2, in operation S904.

When the value of "i" is equal to the value of "n" (that is, "Y" in operation S907), the controller 130 may determine the read retry operation of the first logical page is failed, and end the operations S802 to S808.

In operation S908, when the read operation performed in operation S904 succeeds (that is, "Y" in operation S906), the controller 130 may store the second read level RB_LSB of the $i^{th}$ read bias set RBSi of the successful read operation, as a first priority level PRB1.

In operation S910, the controller 130 may control the memory device 150 to perform the read retry operation on the second logical page by sequentially using the read levels, included in each of the read bias sets, based on the read retry table. The controller 130 may increase "j" by a value of "1", using first and third read level RB_MSB1 and RB_MSB2 of a $j^{th}$ read bias set RBSj whenever the read operation is failed. The controller 130 may control the memory device 150 to repeatedly perform the read operation by applying a different read bias set until the read retry operation is successfully performed on the second logical page.

In operation S912, the controller 130 may control the memory device 150 to perform the read operation on the second logical page, using the first and third read level RB_MSB1 and RB_MSB2 of the $j^{th}$ read bias set RBSj. In an initial stage, the controller 130 may control the memory device 150 to perform the read operation on the second logical page, using the first and third read level R11 and R13 of the first read bias set RBS1.

In operation S914, the controller 130 may perform the ECC decoding operation on MSB data read in operation S912. The controller 130 may determine that the read operation has succeeded when errors are correctable, and determine that the read operation has failed when errors are not correctable. When the read operation has failed (that is, "N" in operation S914), the controller 130 may determine whether values of "j" and "n" are equal in operation S915.

When the value of "j" is smaller than the value of "n" (that is, "N" in operation S915), the controller may increase index "j" by a value of "1" in operation S913, and the controller 130 may return back to the operation S912 and control the memory device 150 to perform the read operation on the second logical page, using the first and third read level R12 and R32 of the second read bias set RBS2, in operation S912.

When the value of "j" is equal to the value of "n" (that is "Y" in operation S915), the controller 130 may determine the read retry operation of the second logical page is failed, and end the operations S804 to S808.

In operation S916, when the read operation performed in operation S912 has succeeded (that is, "Y" in operation S914), the controller 130 may store the first and third read levels RB_MSB1 and RB_MSB2 of the $j^{th}$ read bias set RBSj of the successful read operation, as a second priority level PRB2.

Referring to FIG. 9B, the operation S806 described above with reference to FIG. 8 may include operations S918, S920, S922, S924 and S926, and the operation S808 may include operations S928, S930, S932, S934 and S936.

In operation S918, the controller 130, in the read retry table, may lower priorities of read levels corresponding to indexes not greater than the read levels set to the first priority level in operation S908.

In operation S920, the controller 130 may determine whether the index "i", corresponding to the read levels set to the first priority level in operation S908, is equal to or greater than "2". Since a case where the index "i" is smaller than "2" coincides with a case where the read retry operation is successfully performed using a read level corresponding to the highest priority index of the read retry table, the read retry table may not change before and after being updated.

In operation S922, when the index "i" is equal to or greater than a value of "2" (that is, "Y" in operation S920), the controller 130 may set a second read level RB_LSB OF RBSk, corresponding to a "kth" index, to a second read level RB_LSB OF RBSk−1 corresponding to a (k−1)' index. The second read level RB_LSB OF RBSk−1 corresponding to the $(k-1)^{th}$ index may refer to a read level in an initial read retry table before the read retry table is updated. For example, when "k" is "2", which is an initial value, the controller 130 may set a second read level RB_LSB OF RBS2, corresponding to a second index, to a second read level R21 corresponding to a first index. When "k" is 3, the controller 130 may set a second read level RB_LSB OF RBS3, corresponding to a third index, to a second read level R22 corresponding to the second index.

In operation S924, the controller 130 may determine whether values of "k" and "i" are equal. When the value of "k" is not equal to the value of "i" (that is, "N" in operation S924), the controller 130 may repeatedly perform the operations S920 and S922 until the value of "k" is equal to the value of "i" while increasing "k" by a value of "1" in operation S923.

In operation S926, when the values of "k" and "i" are equal (that is, "Y" in operations S924), the controller 130 may set a second read level RB_LSB OF RBS1 of the first read bias set RBS1 to the first priority level PRB1 stored in operation S908. According to the present embodiment, when the read operation is successfully performed during the read retry operation for the first logical page, the controller 130 may include the read level of the successful read operation into a highest priority read bias set within the read retry table, and update the read retry table.

In operation S928, the controller 130, in the read retry table, may lower priorities of read levels corresponding to indexes not greater than an index "j" corresponding to the read levels set to the second priority level in operation S916.

In operation S930, the controller 130 may determine whether the index "j", corresponding to the read levels set to the second priority level in operation S928, is equal to or greater than "2". Since a case where the index "j" is smaller than "2" coincides with a case where the read retry operation is successfully performed using a read level corresponding to the highest priority index of the read retry table, the read retry table may not change before and after being updated.

In operation S932, when the index "." is equal to or greater than a value of "2" (that is, "Y" in operation S930), the controller 130 may set first and third read levels RB_MSB1 and RB_MSB2 OF RBSI, corresponding to an "I$^{th}$" index, to first and third read levels RB_MSB1 and RB_MSB2 OF RBSI-1 corresponding to an (I-1)$^{th}$ index, respectively. The first and third read levels RB_MSB1 and RB_MSB2 OF RBSI-1 corresponding to the (I-1)$^{th}$ index may refer to a read level in an initial read retry table before the read retry table is updated. For example, when "k" is "2", which is an initial value, the controller 130 may set first and third read levels RB_MSB1 and RB_MSB2 OF RBS2, corresponding to a second index, to first and third read levels R11 and R31 corresponding to a first index. When "k" is 3, the controller 130 may set first and third read levels RB_MSB1 and RB_MSB2 OF RBS3, corresponding to a third index, to first and third read levels R12 and R32 corresponding to the second index.

In operation S934, the controller 130 may determine whether values of "I" and "j" are equal. When the value of "I" is not equal to the value of "j" (that is, "N" in operation S934), the controller 130 may repeatedly perform the operations S930 and S932 until the value of "I" is equal to the value of "j" while increasing "I" by a value of "1" in operation S933.

In operation S936, when the value of "I" is equal to the value of "j" (that is, "Y" in operation S934), the controller 130 may set first and third read levels RB_MSB1 and RB_MSB2 OF RBS1 of the first read bias set RBS1 to the second priority level PRB2 stored in operation S916. According to the present embodiment, when the read operation is successfully performed during the read retry operation for the second logical page, the controller 130 may include the read level of the successful read operation into a highest priority read bias set of the read retry table, and update the read retry table.

FIG. 10A is a diagram illustrating an updated read retry table.

For convenience in description, the following descriptions will be made by illustrating an example of a case where during the read retry operation performed using the read retry table 602 illustrated in FIG. 6, the read operation on the first logical page is successfully performed, which uses a second read level RB_LSB OF RBS4 (i.e., the read level R23) corresponding to a fourth index, and the read operation on the second logical page is successfully performed, which uses the first and third read levels RB_MSB1 and RB_MSB2 OF RBS2 (i.e., the read levels R11 and R31) corresponding to the second index.

When the read operation on the first logical page has been successfully performed, which uses the second read level RB_LSB OF RBS4 corresponding to the fourth index, the controller 130 may set second read levels RB_LSBs OF RBS2 to RBS4, corresponding to the second to fourth indexes, to second read levels R21, R22 and R23 corresponding to the first to third indexes, respectively. In addition, the controller 130 may set a second read level RB_LSB OF RBS1, corresponding to the first index, to a second read level R24 corresponding to the fourth index.

In a similar manner, when the read operation on the second logical page has been successfully performed, which uses the first and third read levels RB_MSB1 and RB_MSB2 OF RBS2 corresponding to the second index, the controller 130 may set the first and third read levels RB_MSB1 and RB_MSB2 OF RBS2, corresponding to the second index, to first and third read levels R11 and R31, respectively. In addition, the controller 130 may set first and third read levels RB_MSB1 and RB_MSB2 OF RBS1, corresponding to the first index, to first and third read levels R12 and R32, respectively.

FIG. 10B is a diagram illustrating an updated read retry table in a TLC memory device.

A first read retry table 1004 illustrated in FIG. 10B represents a read retry table in an initial state in the TLC memory device, and a second read retry table 1006 represents a read retry table after an update operation is performed on the first read retry table 104. For convenience in description, the following descriptions will be made by illustrating as an example a case where first to third logical pages may store LSB, CSB and MSB data, respectively, and the read retry operations for the first to third logical pages are successfully performed in the read operations that use read levels included in a fourth read bias set RBS4, a first read bias set RBS1 and a second read bias set RBS2, respectively.

Referring to the second read retry table 1006 illustrated in FIG. 10B, in a case of third and seventh read levels RB_LSB1 and RB_LSB2 corresponding to the first logical page, it may be seen that the third and seventh read levels RB_LSB1 and RB_LSB2 of the first read bias set RBS1 in the second read retry table 1006 are changed to third and seventh read levels R34 and R74 included in the fourth read bias set RBS4 in the first read retry table 1004.

Similarly, in a case of second, fourth and sixth read levels RB_CSB1 to RB_CSB3 corresponding to the second logical page, it may be seen that the second, fourth and sixth read levels RB_CSB1 to RB_CSB3 of the first read bias set RBS1 in the second read retry table 1006 are maintained as second, fourth and sixth read levels R21, R41 and R61 included in the first read bias set RBS1 in the first read retry table 1004.

In a case of first and fifth read levels RB_MSB1 and RB_MSB2 corresponding to the third logical page, it may be seen that the first and fifth read levels RB_MSB1 and RB_MSB2 of the first read bias set RBS1 in the second read retry table 1006 are changed to first and fifth read levels R12 and R52 included in the second read bias set RBS2 in the first read retry table 1004.

Figure 11:
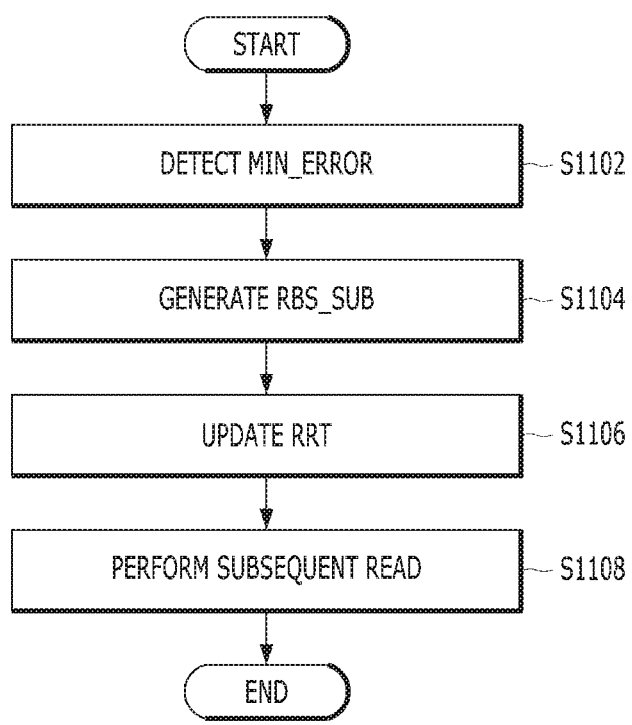
FIG. 11 is a flowchart illustrating a method for generating a sub read bias set.

FIG. 11 is a flowchart illustrating a method for generating a sub read bias set.

In operation S1102, the controller 130 may detect a read level MIN_ERROR used in a read operation corresponding to a minimum number of error bits, based on the number of error bits occurring during the read operations for each of pages included in a memory block. Specifically, the controller 130 may obtain a first minimum number of error bits occurring during a read retry operation for each of first logical pages included in each of the pages. In addition, the controller 130 may obtain a second minimum number of error bits occurring during the read retry operation for each of second logical pages included in each of the pages.

In operation S1104, the controller 130 may generate a sub read bias set RBS_SUB by combining read levels corresponding to the first and second minimum number obtained in operation S1102. The controller 130 may set a second read level of the sub read bias set RBS_SUB to the read level corresponding to the first minimum number. In addition, the controller 130 may set each of first and third read levels of the sub read bias set RBS_SUB to the read levels corresponding to the second minimum number.

In operation S1106, the controller 130 may update a read retry table by adding the sub read bias set RBS_SUB, generated in operation S1104, to the read retry table. According to the present embodiment, the controller 130 may update the read retry table so that the sub read bias set RBS_SUB is preferentially used in a subsequent read operation. For example, the controller 130 may update the read retry table so that the sub read bias set RBS_SUB corresponds to a first index.

In operation S1108, the controller 130 may control the memory device 150 to perform a subsequent read retry operation SUBSEQUENT READ with the read retry table updated in operation S1106. According to the present embodiment, the controller 130 may obtain a minimum number of error bits occurring during a read retry operation performed on a specific memory block, and update the read retry table so that a read bias set having a read level corresponding to the minimum number is preferentially used in a subsequent read retry operation. Accordingly, the controller 130 may use the updated read retry table in the subsequent read retry operation, thereby reducing the number of repetitive reads accompanied by the read retry operation and the number of error bits occurring in each of the read operations.

FIG. 12 is a diagram illustrating a method for detecting read levels having a minimum number of error bits.

The controller 130 may store the number of error bits, occurring during each of the read operations, in the form of a table 1202 whenever performing the read retry operation. The controller 130 may store a plurality of tables corresponding to each of the memory blocks, and the table 1202 illustrated in FIG. 12 may be an example for a specific memory block. In an embodiment, the controller 130 may periodically detect the minimum number of error bits for each page. In this embodiment, the minimum number of error bits for each page may be the smallest number among numbers of error bits on each page respectively detected through a number of times of the read retry operation performed on each page within the memory block during the period. In an embodiment, the controller 130 may detect the minimum number of error bits for each page when read retry operations are performed on all the pages within the memory block. In this embodiment, the minimum number of error bits for each page may be the smallest number among numbers of error bits on each of all the pages respectively detected through the read retry operations performed on all the pages within the memory block.

The table 1202 may include the number of error bits occurring during the read retry operation performed with read levels included in a read retry table for a plurality of logical pages. For example, referring to the table 1202, the number of error bits, which occurs during reading a first logical page LSB of an $m^{th}$ page PAGE m of a specific memory block using a second read level included in a fifth read bias set RBS5 of the read retry table, may be "Em25".

The controller 130 may detect a minimum number of error bits for each logical page. For example, the minimum number of error bits E121 to Em25 for the first logical page LSB may be "Em25", which is the number of error bits occurring during reading the $m^{th}$ page PAGE m. The controller 130 may detect the minimum number of error bits MIN for the first logical page as "Em25". In a similar manner, the controller 130 may detect the minimum number of error bits MIN for second logical pages MSB1 and MSB2 as "En13" and "En33", respectively, which are the number of error bits occurring during reading an $n^{th}$ page PAGE n with read levels included in a third read bias set RBS3.

FIG. 13 is a diagram illustrating a method for updating a read retry table with a read level corresponding to the minimum number of error bits.

A read retry table 1302 illustrated in FIG. 13 will be described by illustrating as an example a case where the read retry table is updated by adding a sub read bias set RBS_SUB to the read retry table illustrated in FIG. 10. In addition, the sub read bias set RBS_SUB may be generated according to the example described above with reference to FIG. 12.

The controller 130 may generate the sub read bias set RBS_SUB that includes a second read level R_MIN2, corresponding to the minimum number of error bits Em25 for the first logical page, and first and third read levels R_MIN1 and R_MIN3, corresponding to the minimum number of error bits En13 and En33 for the second logical pages MSB1 and MSB2. The first to third read levels R_MIN1 to R_MIN3 may be detected in the same way as the example described with reference to FIG. 12. The controller 130 may update the read retry table so that the generated sub read bias set RBS_SUB can be preferentially used in a subsequent read retry operation.

The read retry table 1302 illustrated in FIG. 13 shows an updated state by adding the sub read bias set RBS_SUB. The controller 130 may set an application order of the sub read bias set RBS_SUB as the highest priority by placing the sub read bias set RBS_SUB to a first index and the read bias sets, which correspond to first to fifth indexes, to correspond to second to sixth indexes, respectively. In some embodiments, the controller 130 may add the generated sub read bias set RBS_SUB to the read retry table as the last priority.

The memory system according to the embodiments of the present disclosure may update a read retry table to preferentially use read levels having a high probability that a read operation is successfully performed. The memory system may use the updated read retry table in a subsequent read retry operation, thereby reducing the number of repetitive read operations accompanied by a read retry operation, and improving read performance of the memory system.

While the present disclosure has been described with respect to various embodiments, it will be apparent to those skilled in the art that various changes and modifications may be made without departing from the spirit and scope of the invention as defined in the following claims.

What is claimed is:

1. A memory system comprising:
   a memory device including a plurality of memory blocks; and
   a controller suitable for:
   controlling the memory device to store a read retry table that includes a plurality of read bias sets respectively corresponding to a plurality of indexes;
   controlling the memory device to perform a read retry operation with the read bias sets according to an ascending order of the indexes;
   updating, when a read operation is successfully performed during the read retry operation, the read retry table by including read levels of the successful read operation into a read bias set of a highest priority index within the read retry table; and
   controlling the memory device to perform a subsequent read retry operation based on the updated read retry table.

2. The memory system of claim 1,
   wherein the controller controls, when a history read operation for a first memory block is failed, the memory device to perform the read retry operation on the first memory block, and
   wherein the controller controls the memory device to perform the history read operation by using read levels used in a previous read operation which was successfully performed on the first memory block.

3. The memory system of claim 1, wherein the controller assigns priorities, which are lower than current priorities by unit index, to read levels corresponding to each of indexes having values that are less than or equal to indexes corresponding to the read levels used in the successful read retry operation, in the read retry table.

4. The memory system of claim 1,
   wherein each of the memory blocks includes a plurality of physical pages each including one or more logical pages,
   wherein each of the read bias sets includes read levels corresponding to each of the logical pages, and
   wherein the controller controls the memory device to perform read retry operations on the logical pages by sequentially using the read levels included in each of the read bias sets.

5. The memory system of claim 4, wherein the controller is further suitable for:
   storing, when a first read operation is successfully performed during a first read retry operation for a first logical page, one or more first read levels of the successful first read operation; and
   storing, when a second read operation is successfully performed during a second read retry operation for a second logical page, one or more second read levels of the successful second read operation.

6. The memory system of claim 5, wherein the controller updates the read retry table independently for each of the logical pages based on results of the first and second read retry operations.

7. The memory system of claim 6, wherein the controller updates the read retry table by including the first and second read levels into the read bias set corresponding to the highest priority index of the read retry table.

8. The memory system of claim 2, wherein the controller is further suitable for generating a sub read bias set based on a number of error bits occurring during each of the read operations for the first memory block.

9. The memory system of claim 8,
   wherein the controller updates the read retry table by assigning the sub read bias set to the highest priority index of the read retry table, and
   wherein the controller controls the memory device to perform the subsequent read retry operation based on the updated read retry table.

10. The memory system of claim 8, wherein the sub read bias set includes read levels of a read operation, during which a minimum number of error bits occur.

11. An operating method of a memory system, comprising:
    loading a read retry table that includes a plurality of read bias sets respectively corresponding to a plurality of indexes;
    performing a read retry operation with the read bias sets according to an ascending order of the indexes;
    updating, when a read operation is successfully performed during the read retry operation, the read retry table by including read levels of the successful read operation into a read bias set of a highest priority index within the read retry table; and
    performing a subsequent read retry operation based on the updated read retry table.

12. The operating method of claim 11,
    further comprising performing a history read operation of performing a read operation with the read levels used in a previous read operation which was successfully performed on a first memory block,
    wherein the performing of the read retry operation includes performing the read retry operation on the first memory block when the history read operation is failed.

13. The operating method of claim 11, wherein the updating of the read retry table includes assigning priorities, which are lower than current priorities by unit index, to read levels corresponding to each of indexes having values that are less than or equal to indexes corresponding to the read levels used in the read operation which is successfully performed during the read retry operation, in the read retry table.

14. The operating method of claim 11,
    wherein each of the read bias sets includes read levels corresponding to each of logical pages, and
    wherein the performing of the read retry operation includes performing read retry operations on the logical pages by sequentially using the read levels included in each of the read bias sets.

15. The operating method of claim 14, further comprising:
    storing, when a first read operation is successfully performed during a first read retry operation for a first logical page, one or more first read levels of the successful first read operation; and
    storing, when a second read operation is successfully performed during a second read retry operation for a second logical page, one or more second read levels of the successful second read operation.

16. The operating method of claim 15, wherein the updating of the read retry table includes updating the read retry table independently for each of the logical pages based on results of the first and second read retry operations.

17. The operating method of claim 16, wherein the read retry table is updated by including the first and second read levels into the read bias set corresponding to the highest priority index of the read retry table.

18. The operating method of claim 12, further comprising generating a sub read bias set based on a number of error bits occurring during each of the read operations for the first memory block.

19. The operating method of claim 18,
wherein the read retry table is updated by assigning the sub read bias set to correspond to the highest priority index of the read retry table, and
wherein the subsequent read retry operation is performed based on the updated read retry table.

20. An operating method of a controller, the operating method comprising:
controlling a memory device to perform a read retry operation on a storage unit with a sequence of sets arranged according to a priority, each of the sets including one or more read biases; and
re-arranging, when the read retry operation is a success with one set among the sets, the sets according to the order by assigning a highest priority to the set which was the success.

\* \* \* \* \*